No. 617,883. Patented Jan. 17, 1899.
W. PAUL.
EDUCATIONAL APPARATUS.
(Application filed Mar. 10, 1898.)
(No Model.)
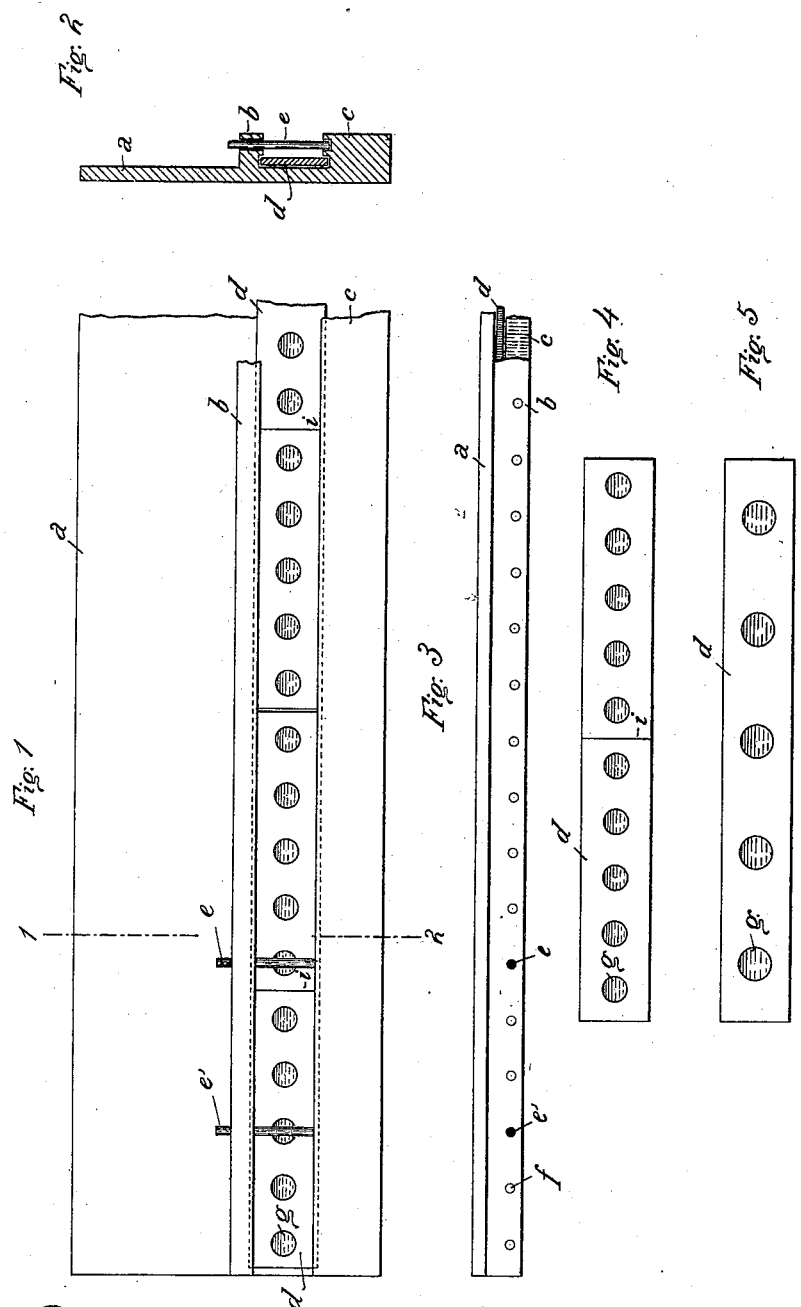

UNITED STATES PATENT OFFICE.

WILHELM PAUL, OF LANGEN-SCHWALBACH, GERMANY.

EDUCATIONAL APPARATUS.

SPECIFICATION forming part of Letters Patent No. 617,883, dated January 17, 1899.

Application filed March 10, 1898. Serial No. 673,386. (No model.)

*To all whom it may concern:*

Be it known that I, WILHELM PAUL, a subject of the Emperor of Germany, residing at Langen-Schwalbach, in the Empire of Germany, have invented certain new and useful Improvements in Educational Apparatus, of which the following is a specification.

This invention relates to educational apparatus of that class useful in teaching children the initial steps in the various processes and kinds of calculation; and the invention consists of an educational apparatus comprising a base provided with guides, computation-slides, said computation-slides being provided with computation-spots, computation-pins supported in sockets of said guides for indicating the computation-spots, and a writing-surface arranged on said base adjacent to said computation-slides for illustrating relatively to the computation-spots the operations carried on with the apparatus, and, further, in a computation-slide provided at both sides with computation-spots, the spots of one side being less in number than those of the opposite side, in combination with means for indicating the spots, so that either side of the slide may be employed in the various calculations.

In the accompanying drawings, Figure 1 is a front view of a part of the apparatus. Fig. 2 is a vertical transverse section on line 1 2, Fig. 2. Fig. 3 is a top view of Fig. 1. Fig. 4 is a side view of a computation-slide, showing one side of the same and illustrating the arrangement of the computation-spots thereon; and Fig. 5 is a side view of the computation-slide shown in Fig. 4, illustrating the opposite side of the same.

Similar letters of reference indicate corresponding parts.

Referring to the drawings, $a$ represents the body or base of my improved apparatus, which is provided with a lower guide $c$, which aids in supporting the apparatus in upright position when the same is used, and an upper guide $b$. The base is extended above the upper guide. The surface of these parts may be painted black or prepared as a blackboard, so as to permit their being written upon as the various operations are carried on. Between the guides $b$ and $c$ computation-slides $d$ of any suitable material are arranged, the same being adapted to slide in grooves on the inner faces of the guides, and thereby be retained in the apparatus during use. The slides are preferably colored in different colors, so as to be distinguished from each other, and each slide is provided on one side with ten computation-spots $g$ and a central dividing-line $i$, as shown in Fig. 4, and on the other side with five spots, preferably of larger size, without a dividing-line, as shown in Fig. 5, the distance between the spots of the latter side being twice that of the side shown in Fig. 4. In the upper guide are provided perforations $f$, which are arranged at the same distance apart as the computation-spots of the slide shown in Fig. 4, while in the lower guide are sockets or depressions corresponding in location to the perforations $f$. A number of computation-pins $e\ e'$ are provided, which are adapted to be inserted into the perforations in the guide $b$, their lower ends being seated in the corresponding sockets in the lower guide $c$.

In using the apparatus the computation-slides are inserted end to end between the guides, as indicated in Fig. 1, so that their spots are in alinement with the perforations in the upper guide, and calculation is preferably made from left to right, the different operations being represented by the insertion or withdrawal or even displacement of the pins $e\ e'$ before the computation-spots of the slides. When the five-spot side of the slides is used, two slides of the same color are always inserted side by side, so as to form a "ten" division. When the ten-spot side is used, however, differently-colored slides are arranged adjacent to each other, so that the division between each "ten" is clearly indicated. The position of the slides has to be adjusted slightly different in the grooves when the different sides are used, so that the spots are alined with the perforations.

In order that the operation of the device may be clearly understood, the following examples of calculation by its use are given.

Addition: Two numbers—for instance, 3 and 3—are to be added. A pin $e'$ is inserted at the left before the third spot, three spots are counted from that pin, and a second pin is inserted. The second pin is shown to the child, and the first pin withdrawn, so that 3 plus 3 gives the number 6.

Subtraction: 3 from 6. Six spots are counted off, a pin inserted before the sixth, three spots then counted, back from the pin from right to left, and the pin $e'$ inserted, so that the child can count from left to right to the pin $e'$, and thus obtain the result.

Multiplication: The multiplicand—for instance, 3—is counted as many times successively and as many pins $e$ inserted as is required by the multiplier—for instance, 2. The pins are then drawn out to the last one, whereby the product, 6, is found.

Division is effected as multiplication, but in the reverse direction.

The advantages of my improved apparatus are, first, that a writing-surface is provided on the base adjacent to the computation-spots, so that as each operation is performed the factors and the results may be set down in figures opposite the spots, and by this means the apparatus is adapted for use with children who have not as yet learned the numerals and who are unable to read figures. They are thus gradually taught the simple operations of arithmetical calculation, and at the same time learn the value of the numerals and higher numbers. Second, by the use of computation-slides the tens divisions are made, with the advantage that as the slide is provided with spots of different size and number on one side of the slide from those on the other the apparatus is adapted for use with children beginning the study, as well as those further advanced who are not confused by more closely-arranged spots.

Having thus described my invention, I claim as new and desire to secure by Letters Patent—

1. In an educational apparatus, the combination of a base provided with guides, computation-slides provided with computation-spots, computation-pins supported in sockets of said guides for indicating the computation-spots, and a writing-surface arranged on said base adjacent to said computation-slides for illustration relatively to the computation-spots the operations carried on, substantially as set forth.

2. In an educational apparatus, the combination of a computation-slide provided at both sides with computation-spots, the spots of one side being less in number than those of the opposite side, guides for said slide, computation-pins, and means for retaining said pins relatively to the spots of either side of the computation-slide, substantially as set forth.

In testimony that I claim the foregoing as my invention I have signed my name in presence of two subscribing witnesses.

WILHELM PAUL.

Witnesses:
JEAN GRUND,
LUDWIG HEUSER.